Feb. 16, 1954   H. A. KULJIAN   2,669,109
MEANS FOR APPLYING TREATING LIQUID TO A FILAMENT AS
IT MOVES OVER A THREAD STORING AND ADVANCING REEL
Filed Sept. 29, 1949   3 Sheets-Sheet 1
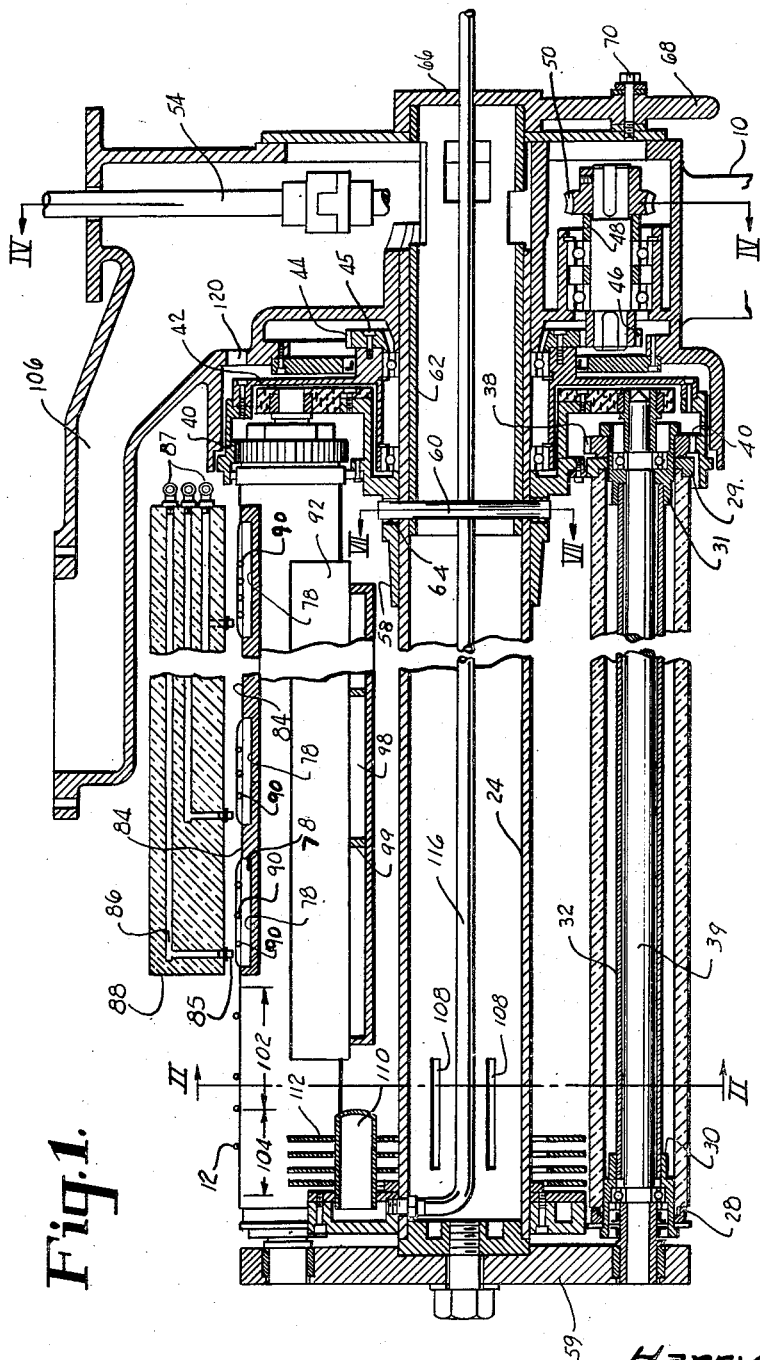
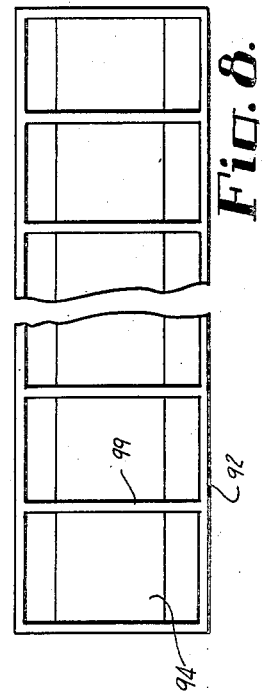
INVENTOR.
Harry A. Kuljian
BY
Louis Necho
Attorney

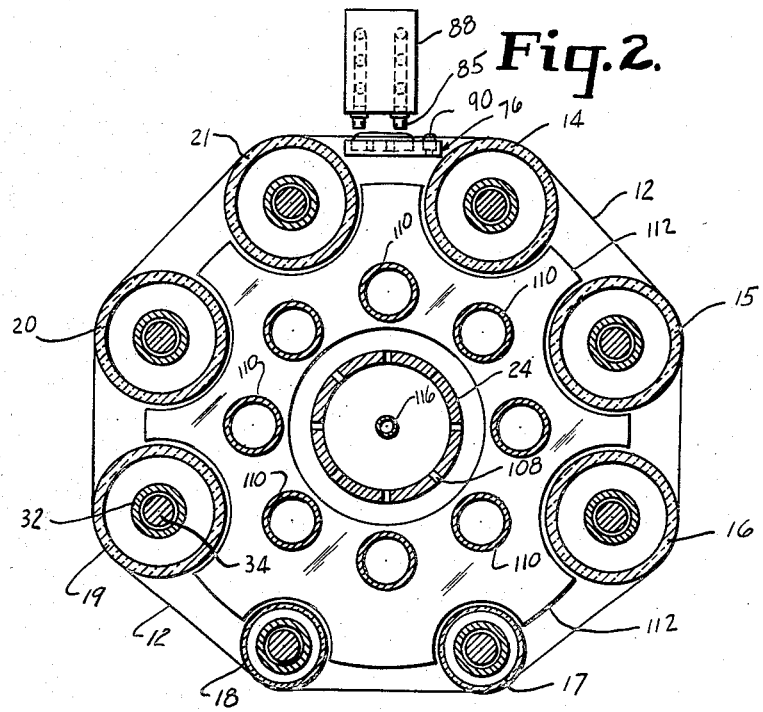
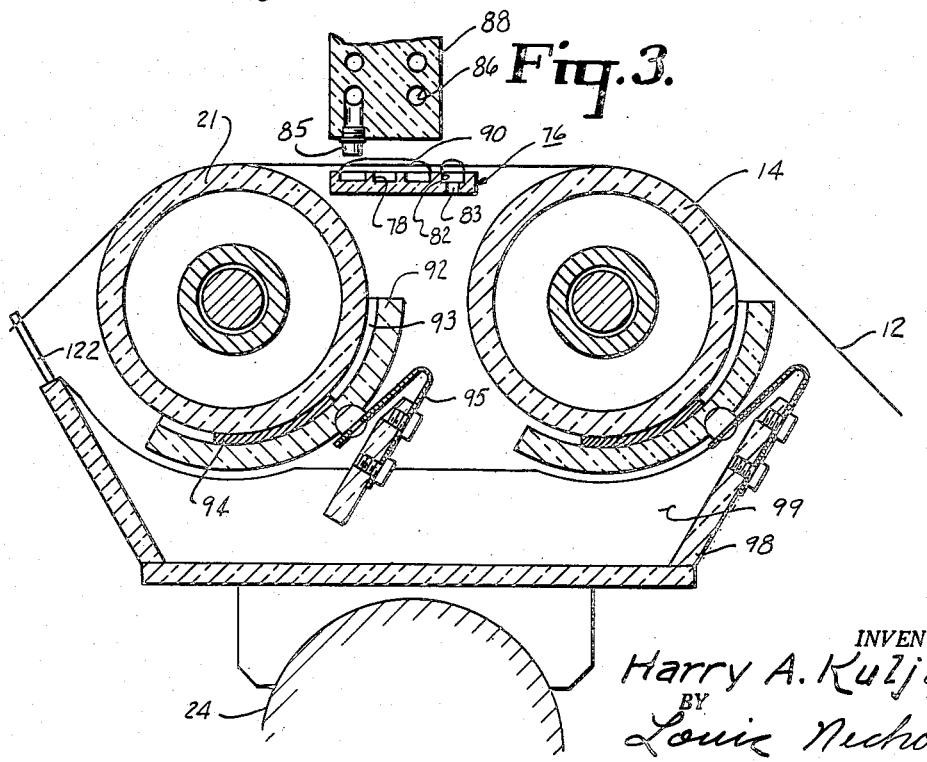

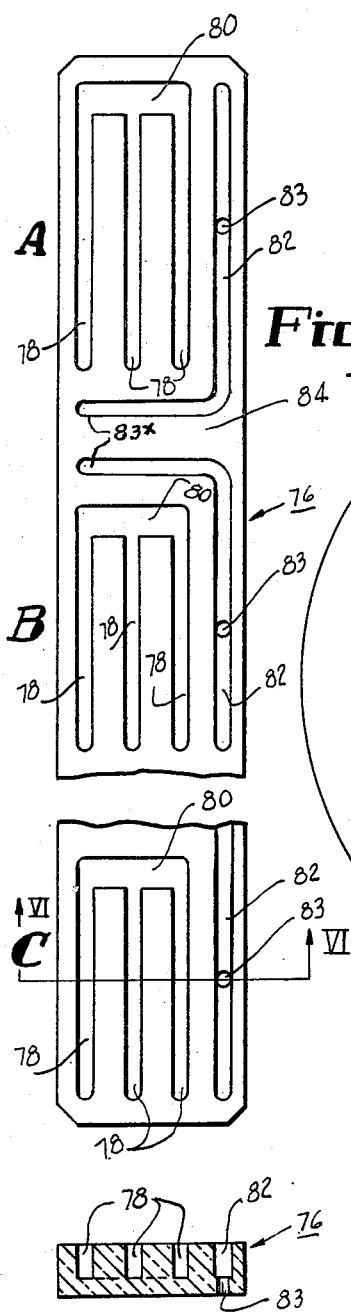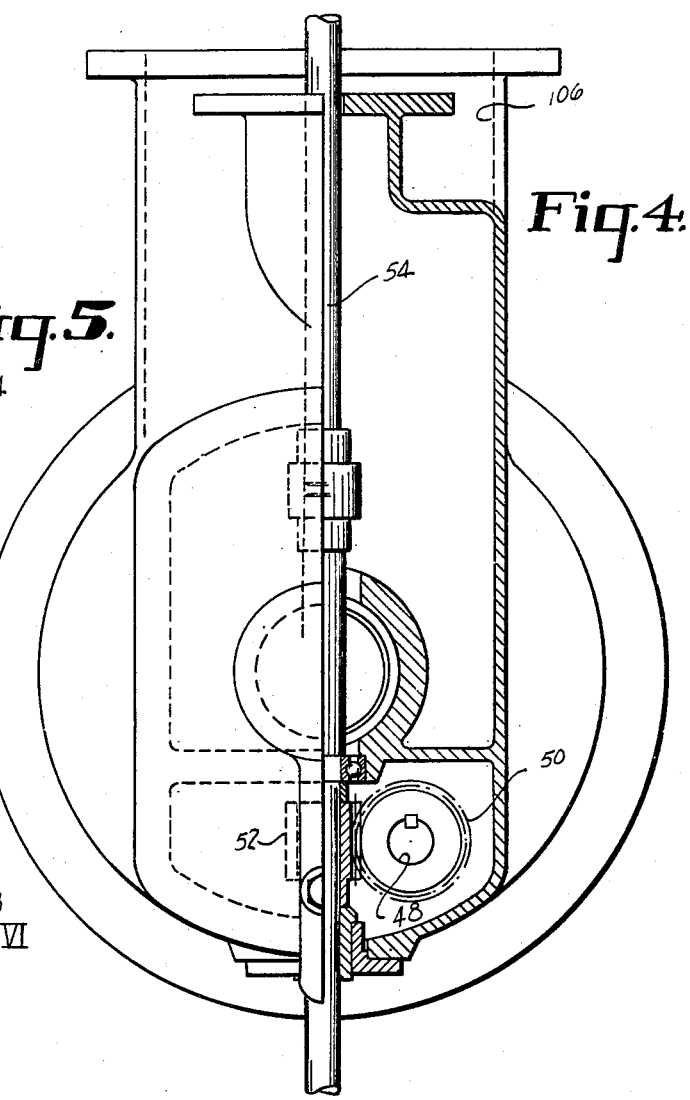

Patented Feb. 16, 1954

2,669,109

UNITED STATES PATENT OFFICE 2,669,109

MEANS FOR APPLYING TREATING LIQUID TO A FILAMENT AS IT MOVES OVER A THREAD STORING AND ADVANCING REEL

Harry A. Kuljian, Merion, Pa., assignor to The Kuljian Corporation, Philadelphia, Pa., a corporation of Pennsylvania Application September 29, 1949, Serial No. 118,655

2 Claims. (Cl. 68—200)

My invention relates to apparatus for the manufacture or processing of synthetic filaments.

The general object of the invention is to produce an improved apparatus of the type set forth.

Apparatus of the kind referred to should include a storing and advancing reel adapted to receive a freshly coagulated filament, and means for supplying various treating liquids to the filament to complete regeneration thereof. It is, therefore, the specific object of the invention to produce improved means for supplying the various liquids to the filament.

In the accompanying drawings:

Fig. 1 is a longitudinal, vertical, sectional view of an apparatus embodying my invention.

Fig. 2 is a transverse vertical sectional view on line 2—2 on Fig. 1.

Fig. 3 is an enlarged, fragmentary view in vertical section showing details of structure.

Fig. 4 is a view, partly in section and partly in elevation, looking in the direction of line 4—4 on Fig. 1, and showing certain parts of the driving mechanism.

Fig. 5 is enlarged plan view of a part of the means for subjecting a filament to liquid treatment.

Fig. 6 is a section on line 6—6 on Fig. 5.

Fig. 7 is an enlarged sectional view taken on line 7—7 on Fig. 1 and showing details of construction.

Fig. 8 is a top plan view of the means used for removing various liquids, in segregated fashion, from the filament.

The apparatus illustrated includes a pedestal 10 for supporting a thread storing and advancing reel on which a synthetic filament 12 is to be processed. The filament is produced by the extrusion of an appropriate solution into a suitable coagulating bath and since this is well known and forms no part of this invention, the formation of the filament is not shown nor described in detail. During its passage over the reel the filament is subjected to treatment by various liquids prior to being dried.

The reel is formed of a number of rolls 14, 15, 16, 17, 18, 19, 20 and 21, which are arranged circularly about a central fixed post 24 and the axes of the rolls are skewed relative to the axis of the post whereby, when the rolls are rotated, a filament wound about one end of the reel will move, in the form of a helix circumscribing all of the rolls, from one end of the reel to the other end thereof. As shown in Fig. 1, the freshly coagulated filament 12 is delivered on to the right-hand end of the reel and moves, helically, toward the left-hand end of the reel.

Each of the rolls is in the form of a cylinder formed of porcelain or other hard and smooth material which is a poor conductor of heat and each cylinder is held in position by being clamped between end plates 28 and 29, which are carried by hubs 30 and 31 engaging the ends of a sleeve or tube 32 passing through the roll. Either or both of the hubs 30 and 31 may be detachably and adjustably engageable with the corresponding end of the sleeve to facilitate assembly and to control the compressive pressure with which the roll is clamped between the plates 28 and 29.

The rolls 14 to 21 are rotated about their axes by means of individual gears 38, which are carried by shafts 39 extending through the tubes 32, as best shown in Fig. 1. The gears 38 engage a common ring gear 40 carried by a hub assembly which includes a head plate 42. The head plate 42 has a gear 44 secured thereto, as at 45, and a pinion 46, carried by a shaft 48 engages the gear 44. The shaft 48 carries a worm wheel 50, which is engaged by a worm 52 on a drive shaft 54. See Fig. 4. The drive shaft 54 is rotated by means of any suitable prime mover, such as an electric motor not shown. All rotating parts are provided with suitable anti-friction bearings which are shown, but which it is unnecessary to describe in detail.

The hub which carries the ring gear 40 also includes a tubular member 58 which is rotatable, in either direction, about the right hand portion of the center post 24, and the rotation of which correspondingly moves the ring gear 40 and the gears 38 on the ends of the shafts 39, and their bearings. Since the other ends of shafts 39 are journalled in end plate 59, which is fixed to the end of the center post 24, the rotation of tubular member 58, ring gear 40 and gears 38 will skew the axes of the rolls relative to the axis of the center post. It will be noted that, when the hub supporting the right-hand ends of the rolls is rotated, the entire assembly, including the anti-friction bearings of the shafts 39 are rotated as a unit.

The tubular member 58 is rotated by means of a pin 60 which engages the tubular member 58 and a sleeve 62, rotatable inside of the right hand portion of the center post 24, there being slot 64 formed in opposite portions of the center post to permit arcuate movement of the pin 60 to the desired extent. The sleeve 62 is secured to a disc 66 and the latter is rotated by means of a handle or lever 68. A set screw 70 may be used for locking the disc 66 against unintentioned movement. It will be understood that only a very limited rotation of sleeve 62, pin 60 and tubular member 58 is needed to skew the axes of the rolls to the desired extent. In practice, movement of the sleeve 62 of about one sixteenth of an inch, in either direction, is sufficient.

As the filament 12 moves from right to left over the reel, it must be subjected to various liquid treatments and it has heretofore been proposed to cause the liquids to drop, or flow in the form of a stream, onto the filament as it moves over one of the rolls of the reel, or as it moves over the space between two adjacent rolls of the reel. This method and means of applying various liquids to the filament are not entirely satisfactory. For example, if the roll onto which the liquid is dropped is rotating relatively fast, the impact of the liquid on the roll tends to scatter the liquid, and, hence, causes waste. Also one is not always sure whether a filament, so treated, will receive a sufficient amount of liquid. To make sure of this, the various liquids must be applied in relatively excessive quantities. In order to overcome these difficulties, I have devised the arrangement best shown in Figs. 1, 2, 3 and 5 by means of which the filament to be treated is caused to pass, continuously, through a body of the desired liquid, with the filament touching no solid support during its passage through the body of liquid.

Referring to Fig. 5, it will be seen that I use a one-piece, elongated tray 76 which is divided to form several liquid receiving sections. Alternately, separable, individual trays can be used for receiving the various liquids. The tray 76 is made of non-corroding material and is molded or milled to produce a number of longitudinal channels 78, which communicate with a transverse channel 80. Parallel to channels 78 and non-communicating therewith, or with channel 80, is another channel 82, which has a drain-hole 83. Each such set of channels is separated from an adjacent set by a raised section 84. By this means a number of separate liquid receiving sections are formed for receiving various liquids. As best shown in Figs. 1 and 5, I have shown three sections, A, B, and C, but this is only for illustration as the number of liquid receiving sections will vary according to the number of different liquids to be used in the treatment of the filament.

The tray 76 is mounted in any suitable position as for example between the uppermost rolls 14 and 21 and the various liquids to be used are delivered to the transverse channel 80 of each liquid receiving section A, B, C, etc. from a spout 85 leading from a duct 86 formed in a block 88, suitably supported above the tray 76 as best shown in Figs. 1, 2 and 3. The different liquids are supplied to the respective ducts 86 through pipes 87 leading to sources of liquids, not shown. It will be noted that the transverse channels 80 communicate with the ends of the liquid receiving channels 78 which are remote from the feed end of the reel so that any given liquid delivered to a transverse channel 80 will flow into channel 78 from left to right, as viewed in Fig. 1, or in a direction opposite to the direction of movement of the thread on the reel. By this means, the filament first contacts the contaminated or diluted liquid in each treating zone, and, as the filament moves to the left, it comes into contact with progressively more concentrated liquid in such zone. It will be noted that this counterflow relationship is attained without tilting the reel or the tray 76.

Water and the other liquids used in the treatment of a synthetic filament, all possess a certain amount of surface tension so that when a small vessel is filled to the brim, the liquid will form an arch, the top of which is above the brim of the vessel, the same as a drop of such liquid, placed on a flat surface, will assume a substantially semispherical form. According to my invention, I take advantage of this characteristic and so position the tray 76 between the rolls 14 and 21 that, as the filament 12 moves from roll 21 to roll 14, it passes through the arched portion of the liquid as shown at 90 in Figs. 1, 2 and 3, without touching the upper edges of the channels 78 and 80. Since the filament moves in the form of a helix having relatively closely spaced convolutions, it will be seen that a relatively large number of convolutions of the filament will be passing simultaneously through the liquid in each set of channels 78. The filament convolutions absorb, and carry away, a certain amount of liquid every time they pass over the tray 76 and the delivery of liquid to any set of channels 78 can be controlled so as to be substantially equal to the amount of liquid removed by the filament. By this means, there will be little or no spillage of liquid from the channels 78 and 80. Any excess liquid carried by the filament convolutions and tending to drop off before reaching roll 14 will, to a substantial extent, fall into the channel 82 and will flow out through drain-hole 83.

As the filament convolutions reach roll 21, they still carry excess liquid which tends to collect along the inner, lower surface of the roll and in order to remove such excess liquid from the roll, I provide a wiper arrangement which is best shown in Figs. 3 and 8. This arrangement includes an arcuate member 92 having transverse wipers 93, which engage the surface of the roll at a point between adjacent treating zones, and longitudinal wipers 94, which are as long as, or slightly longer than the corresponding channels 78. The longitudinal wipers 94 scrape liquid off the adjacent face of the roll and the transverse wipers 93 prevent, or minimize intermingling of the various liquids delivered to the various treating zones. The arcuate member 92 is carried by a spring member 95, which urges the wipers against the roll with a yielding pressure.

An identical wiper arrangement is associated with roll 14 so as to keep this roll as dry as possible and thus encourage transfer of spent liquid from the filament to the roll 14 just prior to next passage of the filament through the treating liquids and thus increases the efficiency of the liquid treatment.

The liquids removed by the wipers 93 and 94, and the liquids flowing through drain-holes 83 are collected in a trough 98 which is divided by partitions 99 into a number of compartments corresponding to the number of liquid treating zones so that the spent liquids are collected in segregated fashion. From the compartmented trough 98 the various liquids are removed, by pipes not shown, to various points of purification and reconcentration for re-use. Water, and other solutions which cannot be profitably salvaged are conducted to a sewer or other point of disposal.

It will be noted that the tray 76 ends well in advance of the delivery end of the reel so as to provide a zone 102 in which no liquid is supplied to the filament, and a zone 104 in which heat is supplied to dry the filament. It will be noted that the wipers of Fig. 8 extend across zone 102 so as to reduce the liquid content of the filament prior to the entry of the filament into the drying zone 104, and thus reduce the length of the drying zone and the heat input necessary for satisfactory drying. In connection with the number and length of the various liquid treating zones, and of the zones 102 and 104, the drawings are to be considered as diagrammatic and not as being to scale.

The filament reaching the drying zone may be dried conductively and convectively as by contact with a heated fluid medium or by means of radiated heat, or by both.

As best shown in Fig. 1, a manifold 106, connected to a source of heated and compressed, or propelled, air, supplies heated air to the interior of the centerpost 24 and the portion of the center-post which corresponds to the drying zone 104 and, possibly, to the adjacent zone 102 also, is provided with radial slots 108 through which the hot air is distributed, radially and into contact with convolutions of the filament passing over the zone 104 and, possibly, the zone 102. In place of, or in addition to, the hot air drying, I provide a finned radiator formed of small tubes 110 having fin plates 112 and supplied with steam or other heated fluid through a pipe 116 which extends through center post 24. The tubes 110 and the slots 108 are arranged to coincide with the spaces intervening between the rolls 14 to 21, as shown in Fig. 2, so as to direct the heat toward the portions of filament spanning the spaces between the rolls.

In order to keep corrosive liquids and fumes out of the hub which houses the driving mechanism, one or more holes 120 are provided for admitting air under pressure into this hub. This air tends to seep out through the clearances, not shown, between the parts, and, in so doing, it prevents entry, through these clearances, of corrosive liquids or fumes. This adequately protects the various gears and bearings shown at the right hand of Fig. 1 from being corroded.

A number of spaced separators 122 might be interposed in the path of the helix formed by the filament to insure separation of the convolutions of the helix and prevent the formation of bundles which, due to one reason or another, sometimes tend to form at some point or other along the filament storing and advancing reel.

Instead of placing the tray 76 just below a line tangent to the uppermost rolls 14 and 21, I may place it just below the lowermost rolls 17 and 18 so that the arch-like portion of the liquid in the channels 78 will project into the path of movement of the filament. If this is done, trough 98 which receives the spent liquids will be positioned below the tray 76.

The drain channels 82 are extended as at 83x to provide transverse drains, as best shown in Fig. 5. By this arrangement the flow of liquid from one zone to another across the intervening portions 84 is effectively prevented as any liquid flowing from any of the cross channels 80 in one zone over the adjacent portion 84 will be drained off by cross channels 83x.

What I claim is:
1. The combination with a thread storing and advancing reel having at least two elongated, spaced, substantially parallel rolls adapted to receive a freshly coagulated filament in the form of a plurality of convolutions circumscribing said rolls and movable, upon rotation of said rolls, from the feed end to the delivery end of said rolls, of means for applying treating to said filament as said convolutions move circumferentially and axially of said rolls, said means comprising a body member having a first channel formed in the upper face thereof and disposed substantially normal to the axes of said rolls, and a second channel communicating at one end thereof with said first channel and disposed substantially parallel to the axes of said rolls, said second channel being relatively narrow so that a liquid having a viscosity substantially equal to the viscosity of water and flowing through said second channel will form a dome which extends above the surface of said body member, said body member being mounted between said rolls with its upper surface just below a line tangent to said rolls so that, as said convolutions move over said rolls, they will pass through said dome without touching said body member.

2. The structure recited in claim 1 in which said body member is provided with a third channel substantially parallel to said second channel and having a drain opening formed in a wall thereof, said third channel being spaced from said second channel along a line substantially normal to the axes of said rolls, for receiving liquid which drips off the filament convolutions after they have passed through said dome.

HARRY A. KULJIAN.

References Cited in the file of this patent

UNITED STATES PATENTS

| Number | Name | Date |
|---|---|---|
| 1,240,625 | Taylor | Sept. 18, 1917 |
| 1,929,877 | Bonamico | Oct. 10, 1933 |
| 1,934,796 | Friederich | Nov. 14, 1933 |
| 2,279,961 | Whittaker | Apr. 14, 1942 |
| 2,287,517 | Ewing | June 23, 1942 |
| 2,303,697 | Bergmann | Dec. 1, 1942 |
| 2,308,576 | Kornegg | Jan. 19, 1943 |
| 2,317,747 | Ewing | Apr. 27, 1943 |
| 2,337,357 | Stuewer | Dec. 21, 1943 |
| 2,358,427 | Traill | Sept. 19, 1944 |
| 2,365,096 | Mothwurf | Dec. 12, 1944 |
| 2,380,526 | Hoagland | July 31, 1945 |
| 2,413,413 | McDermott et al. | Dec. 31, 1946 |
| 2,416,534 | Naumann | Feb. 25, 1947 |
| 2,416,535 | Naumann | Feb. 25, 1947 |
| 2,456,120 | Furness | Dec. 14, 1948 |
| 2,481,916 | Ewing | Sept. 13, 1949 |
| 2,499,464 | Crewdson | Mar. 7, 1950 |
| 2,538,283 | Stanley | Jan. 16, 1951 |
| 2,558,734 | Cresswell | July 3, 1951 |